(12) United States Patent
Fukaya

(10) Patent No.: US 6,819,007 B2
(45) Date of Patent: Nov. 16, 2004

(54) INVERTER TYPE GENERATOR

(75) Inventor: Mitsuo Fukaya, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 65 days.

(21) Appl. No.: 10/198,205

(22) Filed: Jul. 17, 2002

(65) Prior Publication Data

US 2003/0015875 A1 Jan. 23, 2003

(30) Foreign Application Priority Data

Jul. 19, 2001 (JP) ........................ 2001-220119
Mar. 25, 2002 (JP) ........................ 2002-083857

(51) Int. Cl.⁷ .............................................. H02P 9/04
(52) U.S. Cl. .................... 290/40 C; 290/40 A; 322/14; 322/15
(58) Field of Search ................ 290/40 R, 40 A, 290/40 C; 322/10, 14, 15, 37

(56) References Cited

U.S. PATENT DOCUMENTS

| 5,012,781 A | | 5/1991 | Yokoyama et al. | |
| 5,086,266 A | * | 2/1992 | Shiga et al. | 322/28 |
| 5,258,700 A | | 11/1993 | Shimizu et al. | |
| 5,786,642 A | | 7/1998 | Wilhelm | 307/72 |
| 5,969,435 A | | 10/1999 | Wilhelm | 307/64 |
| 6,018,200 A | | 1/2000 | Anderson et al. | |
| 6,018,233 A | * | 1/2000 | Glennon | 322/22 |
| 6,175,217 B1 | * | 1/2001 | Da Ponte et al. | 322/19 |
| 6,486,639 B1 | * | 11/2002 | Montret et al. | 322/29 |
| 6,605,928 B2 | * | 8/2003 | Gupta et al. | 322/10 |
| 6,707,170 B2 | * | 3/2004 | Fukaya | 290/40 A |

FOREIGN PATENT DOCUMENTS

| JP | 56049699 | 5/1981 |
| JP | 60-187721 | 9/1985 |
| JP | 60-257795 | 12/1985 |
| JP | 2934675 | 4/1999 |
| JP | 2000-278998 | 10/2000 |
| JP | 2001-211695 | 8/2001 |

* cited by examiner

Primary Examiner—Nicholas Ponomarenko
(74) Attorney, Agent, or Firm—Knobbe, Martens, Olson & Bear LLP

(57) ABSTRACT

An electronically controlled inverter type generator includes an additional DC voltage boosting circuit that is selectively enabled to provide additional load current when needed. The compact, lightweight, and economical generator is a powerful, portable, quiet electrical source for various needs, including camping, and other recreational activities, wherein the generator can quickly accommodate temporary additional load requirements.

15 Claims, 6 Drawing Sheets

INVERTER TYPE GENERATOR

PRIORITY INFORMATION

This application is based on and claims priority to Japanese Patent Application No. 2001-220119, filed on Jul. 19, 2001, and Japanese Patent Application No. 2002-083857, filed on Mar. 25, 2002, the contents of which are hereby expressly incorporated by reference.

BACKGROUND OF THE INVENTION

1. Field of the Invention

The present invention relates generally to an inverter type generator using a compact, lightweight alternator configuration, and more particularly to an inverter type generator including a supplemental DC boosting circuit to supply additional DC current when a high load is present.

2. Brief Description of Related Art

Conventionally, engine driven generators are designed to be able to deliver a maximum possible power rating even if such power is not used or is only used for a temporary amount of time. As a result, typical engine driven generators incorporate high power engines to operate high capacity generating bodies, making the overall design large, uneconomical, and heavy.

Typically, such engine operated generator designs operate a generating body at a high speed where the generating body delivers its rated power output at all times, even though the rated power is not needed for most of the time. Such operation causes the engine to run at an unnecessarily high speed, causing unwanted noise, fuel consumption, increased exhaust emissions, and high operating temperatures.

Conventional engine operated generator designs that provide occasional high power outputs are heavy, loud, and too large. Such conventional high power generator designs fail to deliver operator friendly operation while providing adequate power when required by the operator. Therefore an operator friendly, lightweight, quiet, environmentally friendly engine operated generator design delivering adequate power is needed.

SUMMARY OF THE INVENTION

Compact, lightweight, quiet, economical, and environmentally friendly engine operated generators promote functionality, savings, and successful operation. Such improved designs however pose a challenge of providing adequate power when needed.

One aspect of a preferred embodiment of the present invention is a compact, lightweight engine operated generator incorporating a small engine, a reduced output generator, and a DC/DC converter to boost a battery's voltage output to supply additional power when a high load is present. A reduced engine size and a smaller generator cause less heat to be generated and result in an overall compact, lightweight design.

Another aspect of a preferred embodiment of the present invention is the use of an economy switch to allow the operating engine to run at a decreased speed when a high load is not present to thereby provide less noise, improved fuel economy, and lower exhaust emissions.

Yet another aspect of a preferred embodiment of the present invention is the use of two batteries wired in series to provide a larger voltage to be available to the DC/DC converter, thereby allowing the DC/DC converter to be smaller and lighter, which lessens the overall weight and size of the generator.

BRIEF DESCRIPTION OF THE DRAWINGS

The foregoing features, aspects, and advantages of the present invention will now be described with reference to the drawings of the preferred embodiments that are intended to illustrate and not to limit the invention. The drawings comprise eight figures in which.

DETAILED DESCRIPTION OF THE PREFERRED EMBODIMENTS OF THE INVENTION

Figure 1:
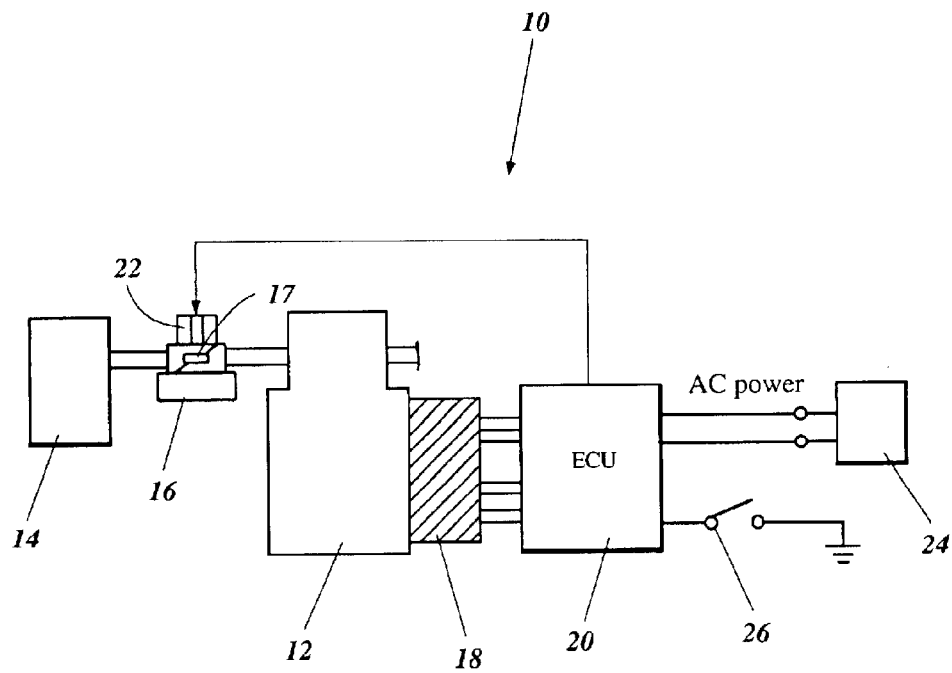
FIG. 1 is a schematic diagram of an engine-operated generator incorporating an electronically controlled throttle.
Figure 2:
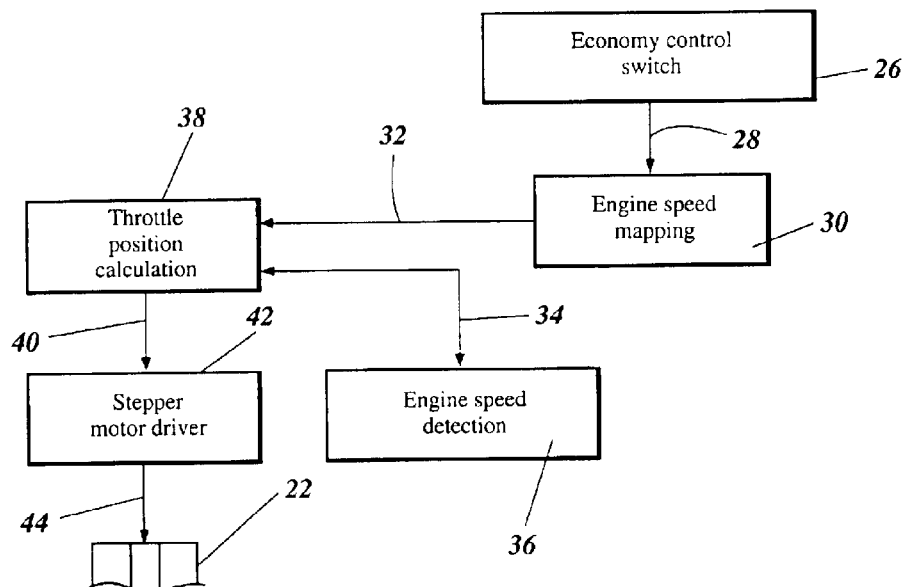
FIG. 2 is a schematic block diagram of the system for controlling the throttle.
Figure 3:
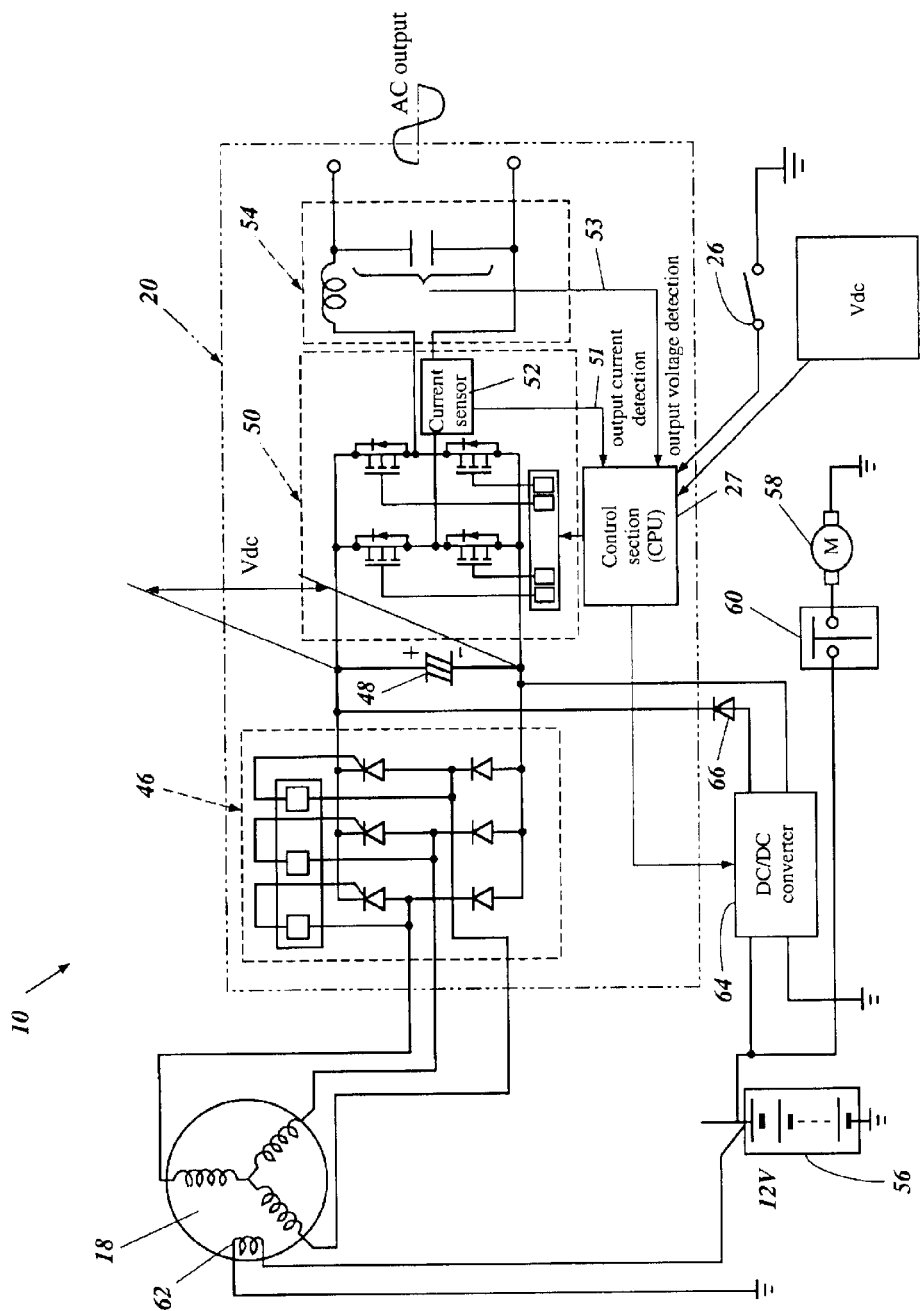
FIG. 3 is a schematic wiring diagram of a power generator including an electronic control unit and voltage conversion sections.

FIGS. 1 through 3 illustrate an overall configuration of an engine operated generator 10 and its control. An engine 12 is connected to an air filter 14 through a carburetor 16. The engine 12 drives an alternating current (AC) voltage generator 18. An electronic control unit (ECU) 20 receives and controls the AC voltage from the generator 10 and controls a throttle 17 in the carburetor 16 to deliver a regulated specific AC output voltage to provide power to various possible loads 24. The ECU 20 controls the throttle 17 via a stepper motor 22, which selectively opens and closes the throttle 17 of the carburetor 16 to control the speed of the engine 12.

An economy control switch 26 delivers a signal to a computing device (e.g., a central processing unit (CPU) 27) within the ECU 20, to selectively cause the ECU 20 to control the speed of the engine 12 at a lower speed. Operating the engine at a lower speed when the economy switch 26 is closed reduces noise, increases fuel economy, and decreases emissions.

FIG. 2 schematically illustrates a control sequence within the ECU 20 that responds to deliver a signal to the stepper motor 22 to control the throttle 17 in the carburetor 16 to vary the engine speed. The economy control switch 26 delivers a signal 28 to an engine speed mapping function 30 that calculates a specific engine speed signal 32 from an engine speed map. The calculated engine speed signal 32 is applied to a throttle position calculation function 38, which compares the calculated engine speed signal 32 to an actual engine speed signal 34 delivered from an engine speed detection function 36. The throttle position calculation function 38 determines a throttle angle required to operate the engine at the determined engine speed and delivers a corresponding signal 40 to a stepper motor driver 42, which actuates the stepper motor 22 through a stepper motor driver signal 44.

FIG. 3 illustrates a schematic diagram of the wiring power generator and the voltage conversion sections controlled by the ECU 20. When driven by the engine 12, the power generator 18 delivers an AC voltage to a rectifier (e.g., a full wave bridge rectifier) 46. A voltage Vdc across an electrolytic capacitor 48 represents the resulting stable consistent direct current (DC) voltage from the rectifier 46. The DC voltage Vdc is delivered to a DC-to-AC (DC/AC) converter 50, which generates a specific AC output voltage. For example, an AC voltage 53 of 110 volts or 240 volts is generated at a frequency of 60 hertz or 50 hertz. Other voltage and frequency combinations may also be generated. The resulting alternating current 51 delivered to a load 24 (FIG. 1) is sensed by a current sensor 52. Signals representing the sensed output current, the DC voltage Vdc, and the AC output voltage 53 are provided as input signals to the CPU 27. The CPU 27 also receives an output from the economy switch 26 as another input signal. The CPU 27 is responsive to the input signals to control the DC/AC converter 50 to provide an accurate AC output at the specific voltage and specific frequency (e.g., 110 volts at 60 hertz, 240 volts at 50 hertz, or the like). A filter 54 eliminates high harmonic noise from the AC voltage to provide a clean, accurate AC voltage at the voltage and frequency required by the load 24.

A battery 56 provides a DC voltage to operate a starter 58 to start the engine 12 through a starting relay 60. A separate DC charging circuit 62 within the power generator 18 maintains the battery voltage at a predetermined value, (e.g., 12 volts).

The magnitude if the power required by the load 24 is determined from the DC voltage Vdc, the AC output voltage 53 from the filter 54, and the sensed alternating current 51 from the current sensor 52. The signals representing the DC voltage Vdc, the AC output voltage value 53 and the measured alternating current 51 are delivered to the CPU 27 to allow the CPU 27 to control the DC/AC converter 50, as discussed above. In addition, the CPU 27 controls a DC/DC converter 64 to selectively provide additional DC current to the input of the DC/AC converter 50 when a high power (i.e., high current) load 24 is present.

The DC/DC converter 64 is driven by the battery 56, and when enabled by the CPU 27, converts the battery DC voltage to a higher DC voltage and provides this additional stepped-up DC voltage to the input of the DC/AC converter 50 in parallel with the DC output voltage from the rectifier 46. The current provided by this additional stepped-up DC voltage is combined with the current provided by the rectified voltage from the rectifier 46 to the DC/AC converter to provide more power when required by the load 24. A diode 66 is positioned between the DC/DC converter 64 and the output of the rectifier 46 to stop current from flowing in the reverse direction when the DC/DC converter 64 is not operated.

Since high power loads occur most often during a start-up period of a load device, such as an air conditioner, a constant high current sourcing capability on the AC output voltage provided to the load is not necessary. By providing this temporary additional stepped-up DC voltage from the battery 56, the engine-operated generator can provide the additional power to a load when necessary and be made smaller, lighter and less expensive.

Figure 4:
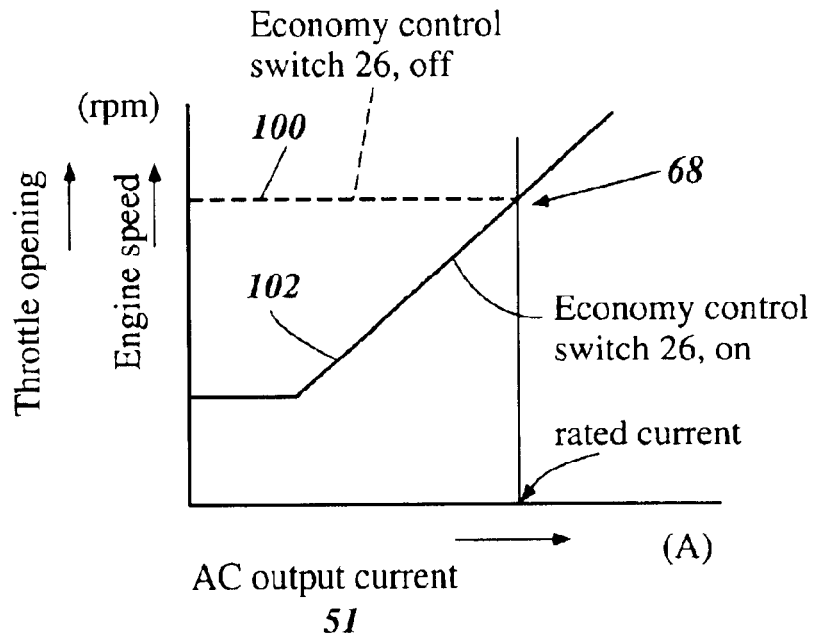
FIG. 4 is a graph of the operation of the engine-operated generator in response to an economy control switch that shows the control of engine speed as a function of an AC output current.

The throttle valve stepper motor driver 42 is controlled in response to the position of the economy switch 26 in accordance with the graph in FIG. 4, which shows the relationship of engine speed and sensed DC/AC converter output current as represented by the sensed current signal 51. When the economy switch 26 is in the open (off) position, represented by a dashed line 100 in FIG. 4, the throttle valve position and the resulting engine speed are constant. This predetermined constant engine speed pertains to a rated alternating current allowing the engine-powered generator 10 to deliver maximum power to the load 24.

When the economy switch 26 is in the closed (on) position, the stepper motor driver 42 controls the throttle valve position to lower the engine speed, as illustrated by horizontal left-most portion of a solid line 102 in FIG. 4. The stepper motor driver 42 then raises the engine speed to increase the alternating current output as the load requires more power, as represented by the sloped right-most portion of the solid line 102. Keeping the engine speed low when a less than rated alternating current is requested allows the engine to operate quieter, more economically, and more environmentally friendly. When the load increases, the speed of the engine 12 is increased to increase the generator output current until the rated alternating current is generated, as represented by a point 68 in FIG. 4.

Figure 5:
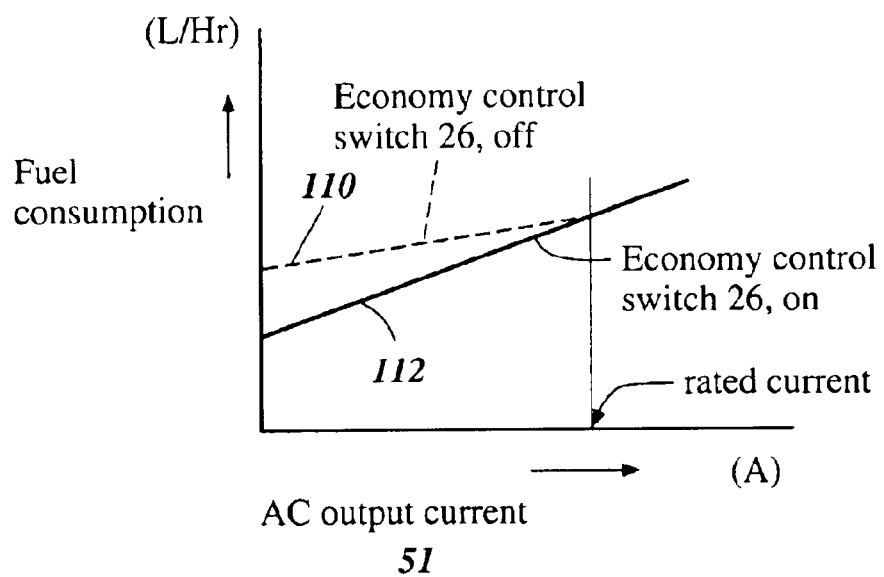
FIG. 5 is a graph of the operation the engine-operated generator in response to an economy control switch that shows the fuel consumption as a function of AC output current.

FIG. 5 illustrates the relationship of fuel consumption to the AC output current. When the economy switch 26 is in the open (off) position, as represented by a dashed line 110, the overall fuel consumption is higher. This higher fuel consumption is caused by the engine 12 operating at a constant high speed. This constant high speed allows the power generator to output high power even when the load 24 does not require such high power. When the economy switch 26 is in the closed (on) position, the stepper motor driver 42 controls the throttle 17 to operate the engine at a lower speed to lower the fuel consumption, as represented by a solid line 112. The decreased fuel consumption at lower engine speeds causes the generator 18 to provide less power; however if additional power is suddenly required by the load, the economy switch 26 can be overridden, and the required power can be made available to the load 24.

Figure 6:
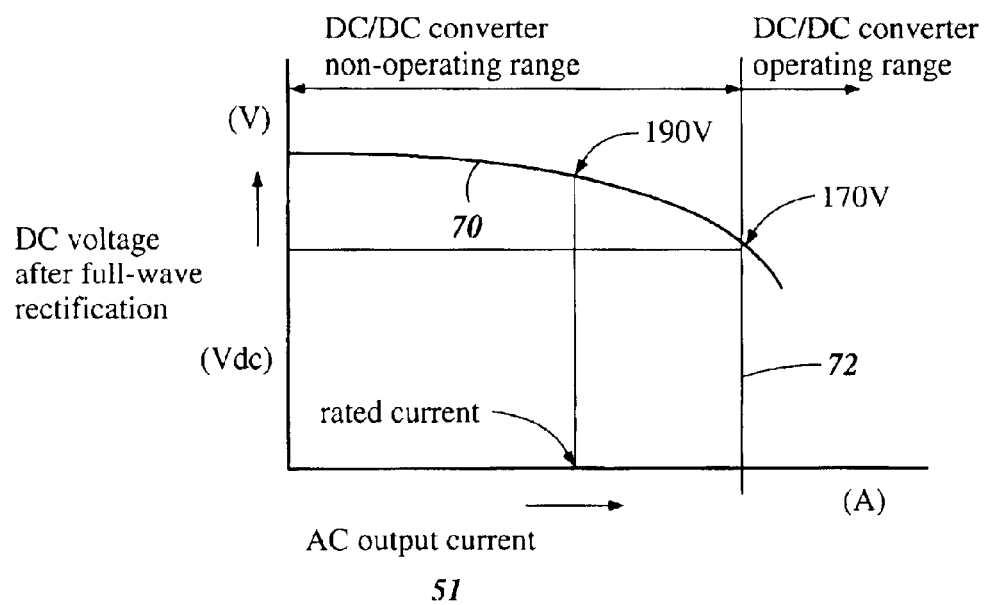
FIG. 6 is graph of the DC voltage provided to the DC-to-AC converter as a function of an AC output current, which shows the first range without additional current from the DC-to-DC converter and the second range with additional current from the DC-to-DC converter.

FIG. 6 illustrates a graph that represents the rectified DC voltage (Vdc) compared to the AC output current. A curved line 70 represents a decrease in Vdc as the output current increases in response to higher load requirements. A Vdc voltage of 190 volts corresponds to the rated AC output current. When Vdc decreases to a voltage of 170 volts as the AC output current increases to a value represented by line 72, the DC/DC converter 64 is activated by the CPU 27 and a supplemental voltage is delivered to the DC/AC converter 50 in parallel with the output of the rectifier 46 to provide the additional current needed to satisfy a high load requirement. When the DC/DC converter 64 is enabled by the CPU 27, the DC/DC converter 64 converts energy from the battery 56 to generate an output voltage at a higher voltage corresponding to the output voltage from the rectifier 46. The output voltage from the DC/DC converter 64 is provided as a second input to the DC/DC converter 64. Thus, the DC/DC converter 64 operates as an additional DC voltage source for the DC/AC converter 50 to supplement the rectified output voltage from the power generator 18.

Figure 7:
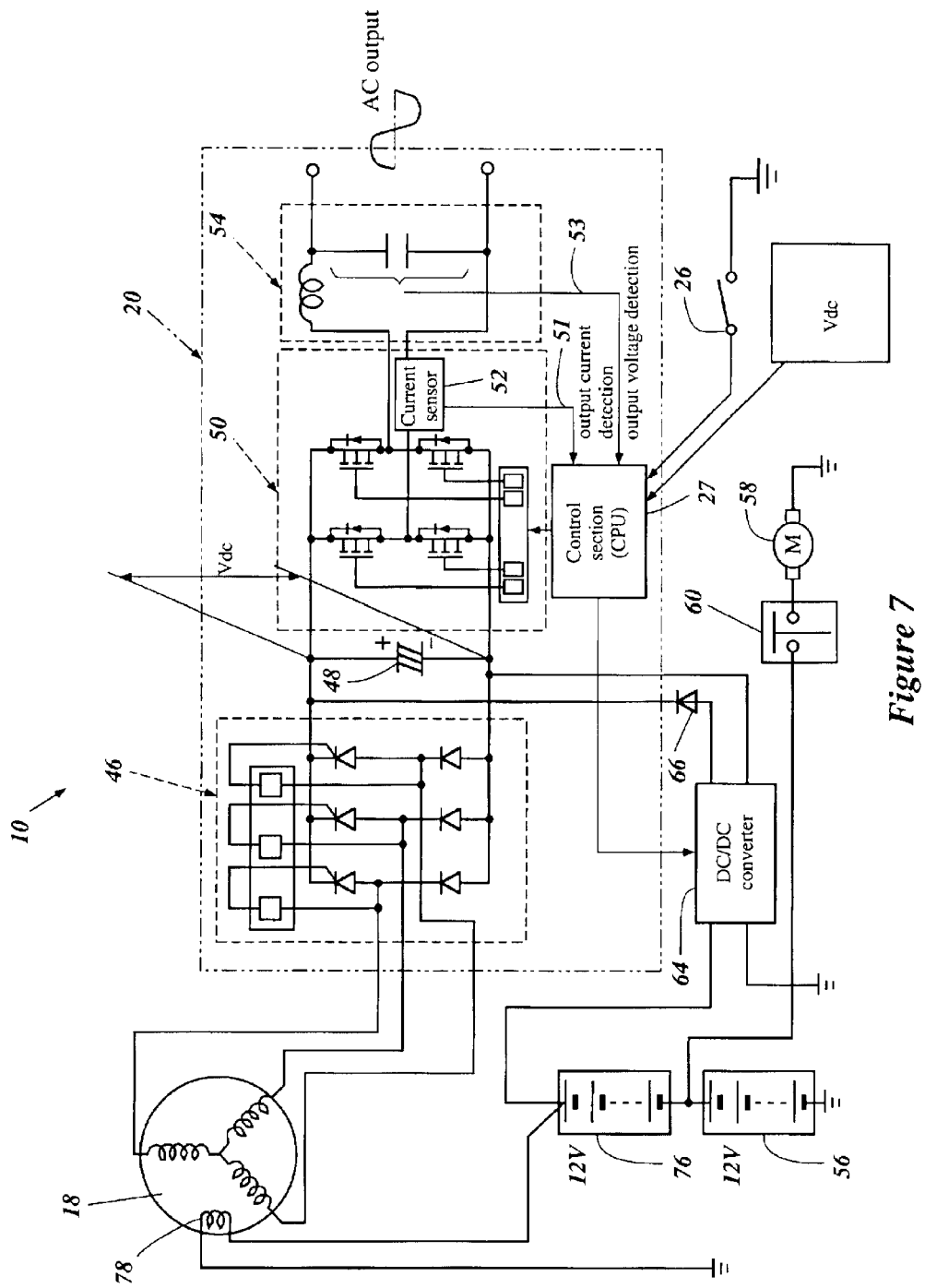
FIG. 7 is a schematic wiring diagram of an alternative embodiment of a power generator, conversion sections, and two batteries connected in series.

FIG. 7 represents another embodiment of the present invention similar to the embodiment of FIG. 3, wherein like elements are numbered as before and will not be explained again. A second battery 76 is connected in series with the first battery 56; however, the first battery 56 is the only battery used to drive the starter 58. Thus, the same starter motor 58 can be used in both embodiments.

The combined voltage of both batteries (e.g., 24 volts) is used by the DC/DC converter 64 to supplement Vdc when a high load is present. Because the input voltage is higher than in the first embodiment, the input current to the DC/DC converter 64 can be reduced to allow less heat loss and to enable a reduction in size, weight and cost of the DC/DC converter 64. The DC voltage provided by the charging circuit 78 in the generator 180 is increased to provide an adequate increased charging voltage to maintain the charge of both batteries 56, 76.

Figure 8:
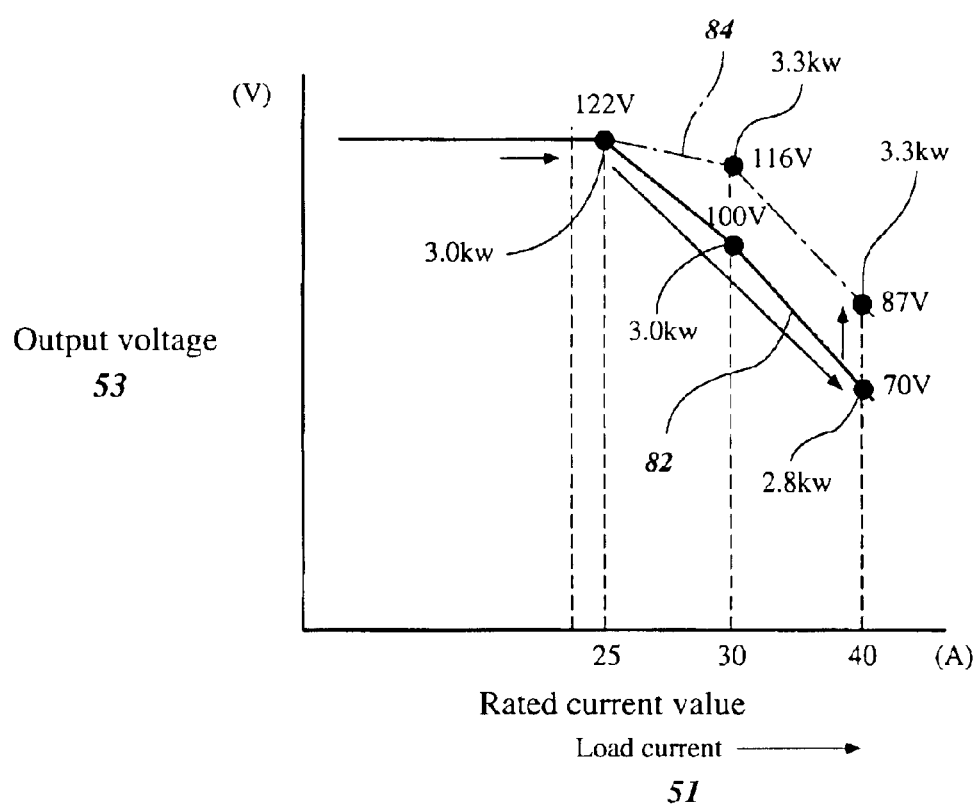
FIG. 8 is a graph of an output voltage as a function of rated current, which shows two output voltage fall-off characteristics.

Another preferred embodiment of the present invention uses two different output voltage fall-off characteristics that depend on the value of the load current 51, as illustrated in FIG. 8. A first output voltage fall-off characteristic, represented by a solid line 82, causes the output voltage to drop during normal output current loads above a rated output current value (e.g., above 25 amps). A second output voltage fall-off characteristic, represented by a dash-dot line 84, illustrates the effect of the supplemental voltage from the DC/DC converter 64 to cause the output voltage to drop with a less aggressive initial decreasing slope to provide a larger output voltage than the first output voltage fall-off characteristic 82 when the current to the external load 24 becomes larger than the rated output current value (e.g., greater than 25 amps).

When the output current rises above the rated output current value (e.g., above 25 amps) when the ECU 20 is operating in accordance with the first output voltage fall-off characteristic 82, the control of the DC/AC converter 50 is switched to model the second output fall-off characteristic 84 for a time period of a few seconds (e.g., 5 seconds) by temporarily enabling the DC/DC converter 64, and is then returned to the first output voltage fall-off characteristic 82. Such a high output current load characteristic can be detected by the current sensor 52 along with other means such as by the detection of a drop in the output voltage 53 or by the detection of a drop in engine speed. The few-second time interval provides sufficient time to successfully provide additional current to initiate a high inductive load without a prolonged period of high load on the DC/AC converter 50. Examples of high inductive loads requiring temporary high currents for initiation are air conditioning units and other appliances using large motors that require high initial currents to start.

The first output voltage fall-off characteristic 82 embodies an output voltage and output current representing a power of approximately 3.0 kW. For example, according to the first voltage characteristic 82 in FIG. 8, since the power is equal to the output voltage multiplied by the rated current, an output voltage of approximately 122 volts corresponds to a current rating of approximately 25 amps. Similarly, an output voltage of approximately 100 volts corresponds to a current rating of approximately 30 amps. Both examples result in power outputs of approximately 3.0 kW. The power value of 3.0 kW represents the normal operational power output of the engine-operating generator 10.

The second output voltage fall-off characteristic 84 embodies an output voltage and output current representing a power of approximately 3.3 kW. For example, according to the second voltage characteristic 84 in FIG. 8, since the power is equal to the output voltage multiplied by the rated current, an output voltage of approximately 116 volts corresponds to a current rating of approximately 30 amps. Similarly, an output voltage of approximately 87 volts corresponds to a current rating of approximately 40 amps. Both examples result in power outputs of approximately 3.3 kW. The power value of approximately 3.3 kW represents the additional DC/DC converted battery power (approximately 0.3 kW) provided by the battery 56 and the DC/DC converter 64 of FIG. 3 in addition to the normal operational power output of approximately 3.0 kW from the engine operating generator 10.

Although the present invention has been described in terms of a certain preferred embodiments; other embodiments apparent to those of ordinary skill in the art also are within the scope of this invention. Thus, various changes and modifications may be made without departing from the spirit and scope of the invention. Moreover, not all of the features, aspects and advantages are necessarily required to practice the present invention. Accordingly, the scope of the present invention is intended to be defined only by the claims that follow.

What is claimed is:

1. An electrical generator system incorporating an internal combustion engine comprising:
    a generator driven by said internal combustion engine, said generator generating an AC voltage;
    a rectifier that receives said generated AC voltage and converts said AC voltage to a rectified DC voltage;
    a DC-to-AC converter that receives said rectified DC voltage and converts said rectified DC voltage to an AC output voltage having a controlled frequency; and
    a supplemental DC voltage supply that provides a supplemental DC voltage to said DC-to-AC converter in addition to said rectified DC voltage when a load connected to receive said AC output voltage requires additional current.

2. The electrical generator system as defined in claim 1, wherein said controlled frequency is 50 hertz.

3. The electrical generator system as defined in claim 1, wherein said controlled frequency is 60 hertz.

4. The electrical generator system as defined in claim 1, wherein said supplemental DC voltage supply comprises a DC-to-DC converter which receives the output of at least one battery as a DC input.

5. The electrical generator system as defined in claim 4, wherein said battery is also used to power a starter motor to start said internal combustion engine.

6. The electrical generator system as defined in claim 1, wherein said supplemental DC voltage supply comprises a DC-to-DC converter which receives the output of at least two batteries as a DC input.

7. The electrical generator system as defined in claim 6, wherein said two batteries are connected in series to generate the DC input to the DC-to-DC converter.

8. The electrical generator system as defined in claim 7, wherein only one of said two batteries generates the power to a starter motor to start said internal combustion engine.

9. The electrical generator system as defined in claim 1 further comprising a computing device and a throttle that controls an operating speed of said internal combustion engine, said throttle being controlled by said computing device, and an economy switch that provides an input signal to the computing device, said computing device responsive to said input signal to control said throttle to vary the operating speed of said internal combustion engine.

10. The electrical generator system as defined in claim 9, wherein said controlled frequency is 50 hertz.

11. The generator electrical system as defined in claim 9, wherein said controlled frequency is 60 hertz.

12. The electrical generator system as defined in claim 1 further comprising a computing device coupled to said internal combustion engine to control an operating speed of said internal combustion engine, wherein said AC output voltage is connectable to a load, and said computing device operates said DC-to-AC converter in accordance with at least first and second AC output voltage fall-off characteristics to control a decrease in the AC output voltage in response to an increase in current provided to the load such that the power provided to the load has a first value when the DC-to-AC converter is operated in accordance with the first fall-off characteristic and has a second value when the DC-to-AC converter is operated in accordance with the second fall-off characteristic.

13. The electrical generator system as defined in claim 12, wherein the first fall-off characteristic provides the AC output voltage and current at values corresponding to a maximum power output of said generator operating alone.

14. The electrical generator system as set forth in claim 13, wherein the second fall-off characteristic provides the AC output voltage and current at values corresponding to a maximum power output of said generator operating in combination with a supplemental DC power supply that provides additional to current to said DC-to-AC converter.

15. The electrical generator system as set forth in claim 14, wherein the supplemental DC power supply comprises a DC-to-DC converter that receives an input voltage from at least one battery and that generates a DC output voltage at a voltage corresponding to said rectified DC voltage.

* * * * *

UNITED STATES PATENT AND TRADEMARK OFFICE
CERTIFICATE OF CORRECTION

PATENT NO. : 6,819,007 B2
DATED : November 16, 2004
INVENTOR(S) : Mitsuo Fukaya

It is certified that error appears in the above-identified patent and that said Letters Patent is hereby corrected as shown below:

Column 7,
Line 3, delete "generator electrical", and insert -- electrical generator --.

Signed and Sealed this

Seventh Day of March, 2006

JON W. DUDAS
*Director of the United States Patent and Trademark Office*